US006891698B2

(12) United States Patent
Sundaram et al.

(10) Patent No.: US 6,891,698 B2
(45) Date of Patent: May 10, 2005

(54) WAFER HAVING SURFACE CONTOURED TO FORM AIR BEARING SURFACES OF A PLURALITY OF GLIDE HEADS

(75) Inventors: Ramesh Sundaram, Fremont, CA (US); Wei Yao, Fremont, CA (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 10/015,045

(22) Filed: Dec. 11, 2001

(65) Prior Publication Data

US 2002/0040595 A1 Apr. 11, 2002

Related U.S. Application Data

(62) Division of application No. 09/176,352, filed on Oct. 21, 1998, now Pat. No. 6,360,428.
(60) Provisional application No. 60/082,235, filed on Apr. 16, 1998.

(51) Int. Cl.$^7$ ............................ G11B 21/00; G01B 21/30
(52) U.S. Cl. ............................ 360/235.4; 360/235.3; 360/234.3; 73/105
(58) Field of Search ............................ 360/135, 234.3, 360/234.4, 235.3, 235.4, 236.6, 237; 73/105

(56) References Cited

U.S. PATENT DOCUMENTS

| | | | |
|---|---|---|---|
| 4,564,585 A | 1/1986 | Blaske et al. | 430/313 |
| 4,961,121 A | 10/1990 | Astheimer et al. | 360/103 |
| 5,137,750 A | 8/1992 | Amin et al. | 427/116 |
| 5,177,860 A | 1/1993 | Yura et al. | 29/603.07 |
| 5,423,207 A | 6/1995 | Flechsig et al. | 73/104 |
| 5,452,166 A | 9/1995 | Aylwin et al. | 360/126 |
| 5,509,554 A | 4/1996 | Samuelson et al. | 216/22 |
| 5,559,051 A | 9/1996 | Voldman et al. | 29/603.12 X |
| 5,588,199 A | 12/1996 | Krounbi et al. | 29/603.16 X |
| 5,603,156 A | 2/1997 | Biskeborn et al. | 29/603.16 |
| 5,605,154 A | 2/1997 | Ries et al. | 600/444 |
| 5,689,064 A | 11/1997 | Kennedy et al. | 73/105 |
| 5,735,036 A | 4/1998 | Barr et al. | 29/603.12 |
| 5,739,048 A * | 4/1998 | Kerth et al. | 437/226 |
| 5,761,005 A | 6/1998 | McKay et al. | 360/104 |
| 5,771,571 A | 6/1998 | Voldman et al. | 29/603.12 |
| 5,808,184 A | 9/1998 | Boutaghou et al. | 73/105 |
| 5,825,181 A | 10/1998 | Schaenzer et al. | 324/212 |
| 6,071,007 A * | 6/2000 | Schaenzer et al. | 73/105 X |
| 6,073,337 A | 6/2000 | Strom | 29/603.12 |
| 6,112,401 A * | 9/2000 | Smith, Jr. | 29/603.12 |
| 6,233,119 B1 * | 5/2001 | Burga et al. | 73/105 X |
| 6,338,269 B1 * | 1/2002 | Burga et al. | 73/105 |
| 2001/0046108 A1 * | 11/2001 | Lewis et al. | 360/294.7 |
| 2002/0018508 A1 * | 2/2002 | Sunderem et al. | 374/7 |

FOREIGN PATENT DOCUMENTS

EP 442 660 A2 8/1991

OTHER PUBLICATIONS

TDB–ACC–NO: MN 9055002 "Thin Film Magnetic Heads", *IBM Technical Disclosure Bulletin*, vol. 21, No. 12, pp. 5002, May 1999.
TDB–ACC–NO: NB9203247, "Dimple/Air Bearing Surface Alignment Process", *IBM Technical Disclosure Bulletin*, vol. 34 No. 10B, pp. 247–249, Mar. 1992.

* cited by examiner

*Primary Examiner*—Thomas P. Noland
(74) *Attorney, Agent, or Firm*—Westman, Champlin & Kelly P.A.

(57) ABSTRACT

An improved glide head has an air bearing surface with a flatness of less than about 1 μinch. The air bearing surfaces are formed from the very smooth and flat surface of a wafer, preferably prior to slicing the glide heads from the wafer. Thus, a wafer is formed having a flat surface with a plurality of air bearing surface contoured onto the surface. To form a glide head, a transducer can be mounted on the air bearing surface or the surface opposite the air bearing surface, preferably at the wafer level before slicing.

17 Claims, 4 Drawing Sheets

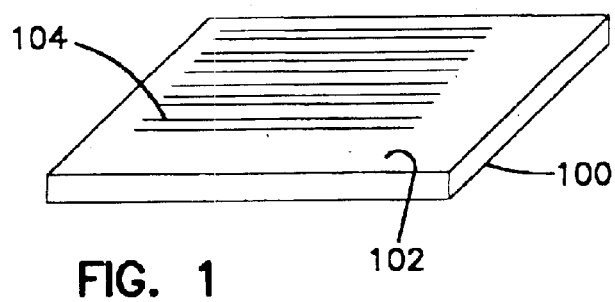
FIG. 1
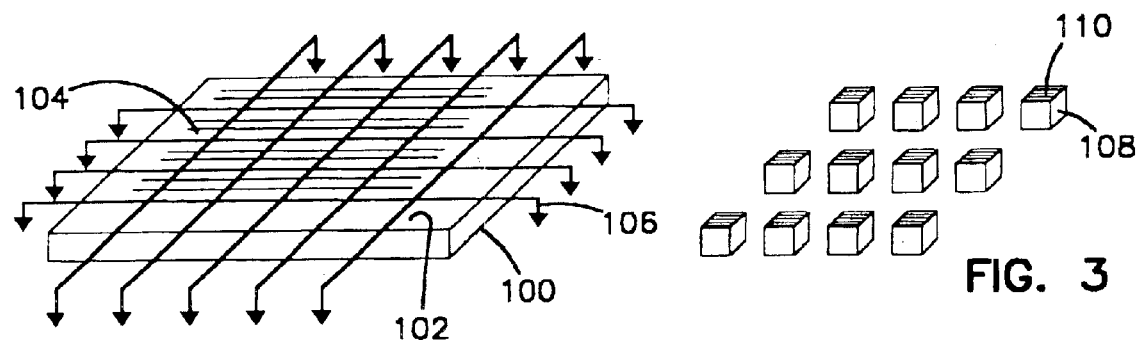
FIG. 2
FIG. 3
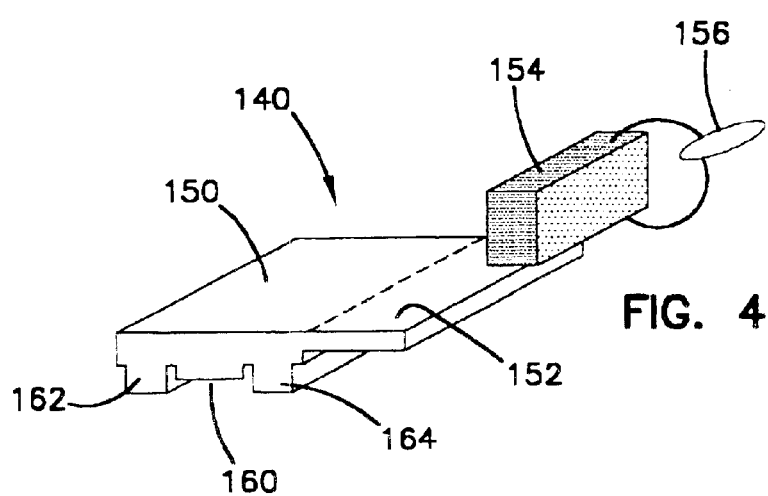
FIG. 4

WAFER HAVING SURFACE CONTOURED TO FORM AIR BEARING SURFACES OF A PLURALITY OF GLIDE HEADS

CROSS REFERENCE TO RELATED APPLICATIONS

This application is a divisional application of U.S. application Ser. No. 09/176,352, filed Oct. 21, 1998 and now U.S. Pat. No. 6,360,428 entitled "GLIDE HEADS AND METHODS FOR MAKING GLIDE HEADS" which claims priority to U.S. provisional patent application Ser. No. 60/082, 235, entitled "Method of Manufacturing Glide Heads," filed on Apr. 16, 1998.

BACKGROUND OF THE INVENTION

The invention relates to glide heads for evaluating the glide quality of a surface of a rotating disc. More particularly, the invention relates to glide heads with improved air bearing surface properties and to efficient methods for making glide heads.

Disc drives are used for storing information, typically as magnetically encoded data, and more recently as optically encoded data, on a disc surface. Glide tests are used to check disc surfaces for defects. In particular, glide tests are used by computer disc manufacturers to control and assure the quality of the disc media. Generally, all hard drive discs are tested before shipment. During a glide test, the glide head or slider flies over a disc surface generally at a predetermined clearance from the disc surface, known as the glide height or fly height.

If contact occurs between the glide head and a disc defect or asperity, the glide head vibrates and deforms. The vibrations can be measured with a piezoelectric transducer (PZT), which generates a varying potential difference between the electrodes of the PZT due to forces on the transducer. Specifically, when the glide head interacts with a defect on the spinning disc, simultaneously excited vibrational modes of the PZT and the head result in voltage fluctuations at corresponding frequencies. If the magnitude of measured voltages exceed predetermined threshold values, the disc may be rejected. Other types of transducers can be used such as thermal asperity detectors or capacitance detectors.

As storage densities on disc recording media become higher, fly heights of read/write heads generally become smaller. Lower fly heights impose narrower restrictions on acceptable heights of asperities/defects on a disc surface since larger defects would result in contact between the read/write head and the disc. Contact between a read/write head and a disc generally results in damage to the head and/or to the disc. The glide quality of a disc directly relates to the ability of a head to fly adjacent the disc at a fixed distance from the disc without colliding with a defect on the disc that results in a deformation of the head producing vibrations with a magnitude above a threshold value, as measured with the transducer. The glide quality of a disc is related to the disc smoothness, although other defects also may alter glide quality.

Glide heads generally are designed to have a fly height that is sensitive to the linear velocity of the disc surface relative to the glide head. To achieve measurements of smaller asperities on the disc surface, the disc velocity can be decreased to decrease the fly height of the glide head.

As the operating fly height or the glide height of the glide head decreases, it becomes necessary to tighten the tolerances on the parameters that induce variability in the glide head fly height. Parameters that add to the glide head fly height variability include the surface flatness and surface roughness of the air bearing surface of the head.

SUMMARY OF THE INVENTION

In a first aspect, the invention pertains to a system for detecting asperities on a disc surface, the system comprising:

a glide head, wherein the glide head has an air bearing surface with a peak-to-valley flatness less than about 1 μinch;

an armature for positioning the glide head over the disc; and a transducer mounted on the glide head, the transducer detecting interactions between the glide head and the disc.

In another aspect, the invention pertains to a glide head comprising an air bearing surface having a peak-to-valley surface flatness less than about 1 μinch and a transducer that produces a signal in response to contact with the glide head. Moreover, the invention pertains to a wafer having a surface contoured for the air bearing surfaces of a plurality of glide heads.

In addition, the invention pertains to a method of producing a glide head, the method including:

contouring a smooth and flat surface of at least a portion of a wafer to form a desired geometry for a plurality of air bearing surfaces of a glide head; and slicing the wafer to form a plurality of glide heads each with air bearing surfaces.

BRIEF DESCRIPTION OF THE DRAWINGS

FIG. 1 is a perspective view of a substrate wafer with a smooth top surface contoured with structures for the air bearing surface of a glide head.

FIG. 2 is a perspective view of the wafer from FIG. 1 with slicing lines appropriately indicated.

FIG. 3 is a schematic, perspective view of the resulting glide heads cut from the wafer of FIG. 2.

FIG. 4 is a schematic, perspective view of a glide head with a PZT transducer mounted on a wing extending from the glide head's top surface.

DETAILED DESCRIPTION OF THE PREFERRED EMBODIMENTS

Figure 5:
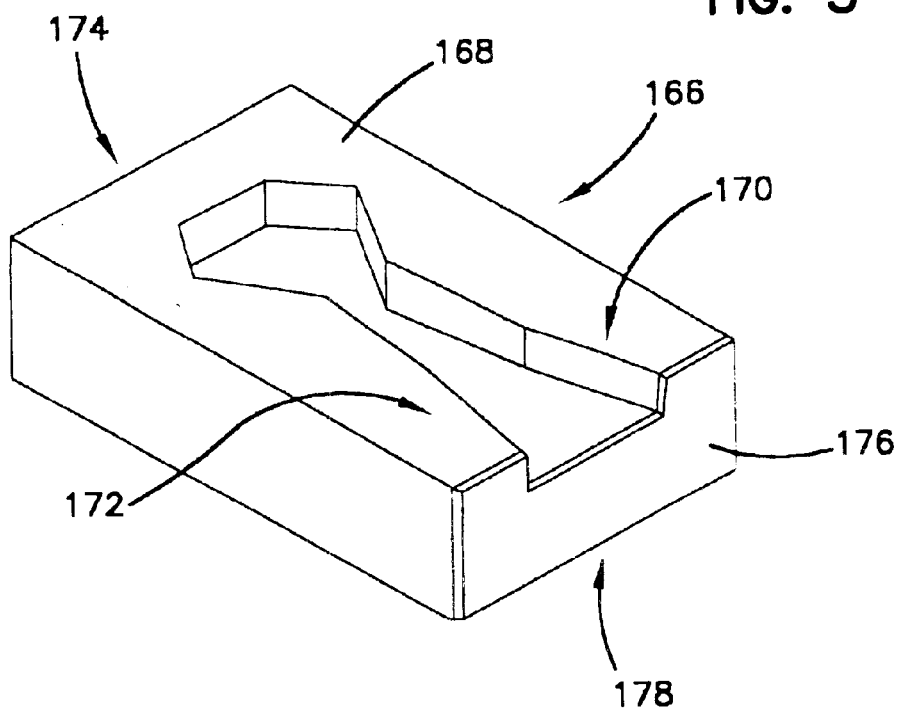
FIG. 5 is a bottom, perspective view of an alternative embodiment of a glide head, the glide head having a negative pressure air bearing surface.

Glide heads/sliders can be formed from a substrate wafer such that an extremely smooth and flat surface of the substrate becomes the air bearing surface of the asperity detection head. With this approach, much of the processing of the air bearing surface can be performed at the wafer level. Thus, many difficult mounting and de-mounting steps can be eliminated. The resulting glide heads have more consistently flat surfaces. The improved properties of the glide head are suitable for performing asperity testing under more exacting tolerances. Although contouring of the air bearing surface may introduce roughness to the surface, applying the contouring to a very smooth surface of the wafer may result in more consistently smooth air bearing surface.

Suitable wafers made from aluminum oxide/titanium carbide composites (AlTiC) are available from a variety of vendors including Sumitomo (Japan), Greenleaf (Saegertown, Pa.), Minnesota, Mining and Manufacturing (Saint Paul, Minn.) and Kyocera (Japan). The surfaces of 4.5 inch by 4.5 inch wafers can have a peak-to-valley flatness of less than about 2 $\mu$m. Cutting the wafer into a significant number of glide heads can result in glide heads with significantly reduced peak-to-valley flatness due to the reduced surface area of the glide head relative to the wafer. The contouring of the air-bearing surface onto the smooth surface of the wafer, however, can result in some loss of flatness. Following the contouring of the air bearing surface upon the very smooth and flat surface of the wafer and slicing, the air bearing surface of a glide head can have a flatness of less than about 1 $\mu$inches, preferably less than about 0.5 $\mu$inches, and more preferably less than 0.2 $\mu$inches. Measurements of flatness of a glide head can be performed using optical measuring instruments available from Wyko Corporation, Tucson, Ariz., or from Zygo Industries, Inc., Portland Oreg.

For the standard processing of a wafer into a read/write head, suitable transducers are deposited on an extremely smooth, extremely flat surface of the substrate wafer. The wafer is then cut into individual head/slider portions. Following the slicing, a cut edge is formed into an air bearing surface using contouring (e.g., ion-milling and DLC coating) and smoothing operations (e.g., rough lap, smooth lap and crown lap). The transducers formed on the smooth surface of the wafer are positioned along an edge of the resulting read/write head.

Glide heads may not have a transducer applied on a side adjacent the air bearing surface. Therefore, for production of glide heads with improved flatness and more uniform smoothness, air bearing surfaces can be defined directly on the very smooth and very flat surface of a substrate wafer. Similarly, contact detection transducers can be deposited or mounted at the wafer level on the air bearing surface or on the surface opposite to the air bearing surface. By performing a larger number of operations at the wafer level, fewer mounting, de-mount and cleaning steps are required at the slider/glide head level.

Referring to FIG. 1, wafer 100 has an extremely smooth and flat surface 102. Rails 104 have been placed upon surface 102. Rails 104 are located on surface 102 such that they are correctly positioned on the air bearing surface of a glide head after wafer 100 is cut into individual glide heads. Other contours can be positioned on wafer surface 102 to form additional features on the resulting air bearing surface of the glide heads, as desired. The slicing lines 106 are shown in FIG. 2. Slicing lines 106 indicate schematically the location of cuts that form glide heads from wafer 100. The resulting glide heads 108 are shown in FIG. 3. Appropriately placed features on wafer surface 102 become contours on the air bearing surfaces 110 of glide heads 108 following the slicing of the wafer to form the glide heads. Alternatively, some or all of the contours on the very flat air bearing surface of glide heads 108 can be formed after glide heads 108 are cut from wafer 100. While processing advantages may be lost by performing the contouring after slicing the individual glide heads, the advantage of a flatter air-bearing surface can be obtained nevertheless.

Glide heads generally also include a transducer. The transducer can be a PZT transducer, a conductivity transducer, a thermal transducer, or other transducers suitable for contact based asperity detection. An enlarged view of an embodiment of a glide head 140 with a PZT transducer is shown in FIG. 4. Glide head 140 has a top surface 150 including wing 152. In the embodiment shown, PZT transducer 154 is supported by wing 152. PZT transducer 154 preferably can be mounted to top surface 150 prior to slicing the wafer into individual glide heads. PZT transducer 154 is attached to a measuring circuit 156 either before or after slicing wafer 100 into glide heads 140. Air-bearing surface 160 is located on the opposite side of the glide head from top surface 150. In this embodiment, air-bearing surface 160 is contoured to have rails 162, 164 as well as to produce wing 152. Generally, this structure of the air bearing surface is produced by saw cuts of the substrate.

An alternative embodiment of a glide head is depicted in FIG. 5. Glide head 166 has an negative pressure air bearing surface 168. A negative pressure air bearing surface results in a glide head with a fly height that is approximately independent of the relative linear velocity between the glide head and the disc surface. The contours of air bearing surface 168 include rails 170 and 172 oriented as shown relative to leading edge face 174 and trailing edge face 176. Generally, air bearing surface 168 is oriented substantially parallel to the opposing surface 178.

The contours of air bearing surface 168 are characteristic of contours made by ion milling or similar processing approaches. The contours of air bearing surface 168 can be modified using principles known in the art to yield an air bearing surface suitable for a glide head in which the fly height varies with the linear velocity of the glide head relative to the disc.

The production methods described herein are suitable particularly for the production of thermal asperity detection heads with a thermal transducer placed directly on the air bearing surface. In the embodiment shown in FIG. 6, thermal transducer 180 is located directly on air bearing surface 182 of glide head 184. Preferably, thermal transducer 180 is located on a very smooth surface formed from smooth wafer surface 102 as shown in FIG. 1.

Figure 6:
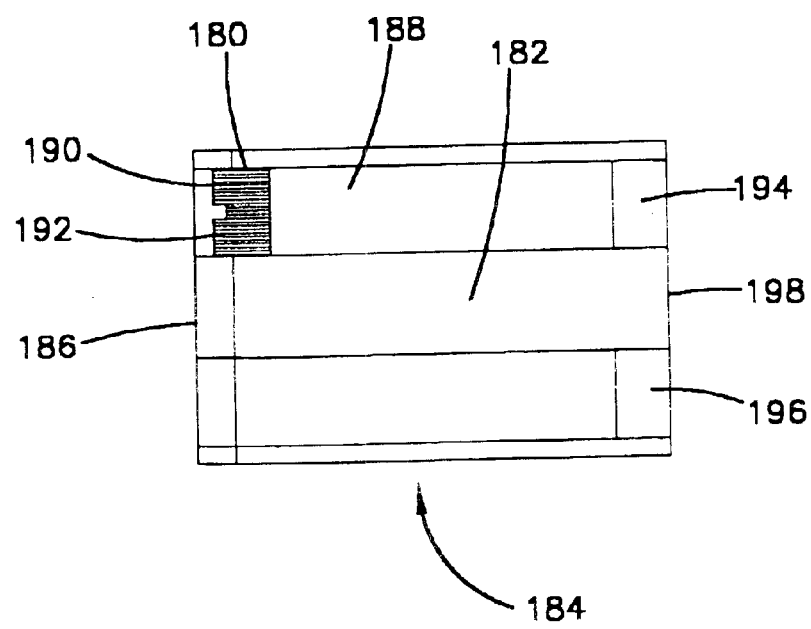
FIG. 6 is bottom view of an asperity detection head with a thermal asperity detector.

As shown in FIG. 6, thermal transducer 180 is located on rail 188 near rear edge 186 of glide head 184. Thermal transducer 180 is in contact with electrically conductive pads 190, 192, which provide for measurements of changes in the electrical resistance of thermal transducer 180. To improve the aerodynamic performance, steps 194, 196 are located near front edge 198 of air bearing surface 182. Thermal transducers 180 are made from material with a resistance that varies with temperature. For example, materials such as NiFe alloy used to form magnetoresistive transducers also exhibit a thermal resistance effect. Electrically conductive pads 190, 192 generally are made of conducting metal, alloy or metal compound. Electrically conductive pads 190, 192 are placed after cutting glide head 184, along the edge of glide head 184 extending approximately from air bearing surface 182 to the opposite surface.

Placement of the thermal asperity detector directly on the air bearing surface provides for more sensitive asperity detection. Furthermore, the use of multiple thermal transducers can be used to grade the severity of the defect. The production and use of thermal asperity detection heads with the thermal transducer placed on the air bearing surface are described further in commonly assigned and simultaneously filed U.S. patent application Ser. No. 09/178,580 to Sundaram et al., entitled "GLIDE HEAD FOR ASPERITY DETECTION," incorporated herein by reference.

Figure 7:
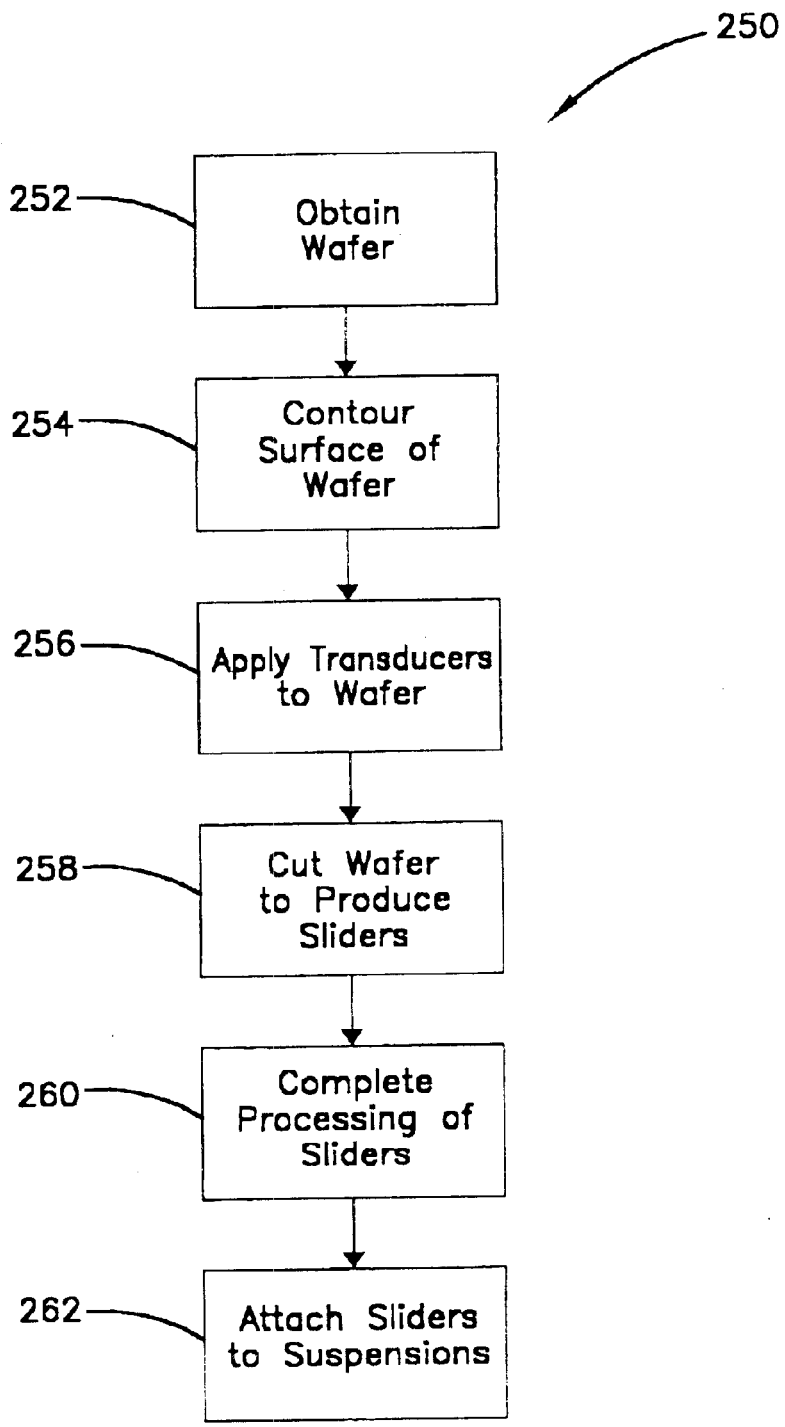
FIG. 7 is a flow chart outlining the process for producing the glide heads.

FIG. 7 provides a flow chart 250 outlining an embodiment of a process for producing glide heads with very flat air bearing surfaces. The process involves obtaining a wafer 252, contouring the surface of the wafer 254, applying transducers to the wafer 256, slicing the wafer to produce glide heads 258, completing the processing of the glide heads 260, and attaching the glide heads to suspensions 262. Further details on the processes and alternative processing approaches are described next.

First, a wafer is obtained 252. While not required to obtain the advantage of a flatter air bearing surface, most or all of the preparation of the air bearing surface preferably is performed at the wafer level to increase processing efficiency. In particular, the air bearing surface preferably is contoured 254 at the wafer level. A variety of contoured profiles can be used to yield desirable aerodynamic performance of the glide head as well as to provide surfaces for the support of transducers and the like. Particular examples of contoured air bearing surfaces can be seen in FIGS. 4–6.

The contouring of the wafer surface to shape the air bearing surface of the resulting glide heads can be performed with one or a combination of various saw cutting, milling and deposition techniques. Preferred milling approaches include, for example, ion milling, reactive ion milling and laser ablation. A variety of deposition techniques can be used alone or in combination including, for example, photolithography and vapor deposition.

Transducers can be applied 256 at the wafer level prior to the slicing of the individual glide heads, or the transducers can be applied to the individual glide heads following cutting of the glide heads. The processing is simplified if the transducers are applied 256 at the wafer level. The transducers are selected for their ability to detect the interaction of a defect with the glide head as the glide head flies above a spinning disc.

Transducers applied at the wafer level are located either on the air bearing surface or on the top surface opposite the air bearing surface of the resulting glide head. For example, PZT transducers detect vibrations resulting from an interaction of the glide head with a defect. PZT transducers generally are placed on the top surface of the glide head either directly over the air bearing surface or on a wing extending off the side of the glide head, as shown in FIG. 4.

Figure 8:
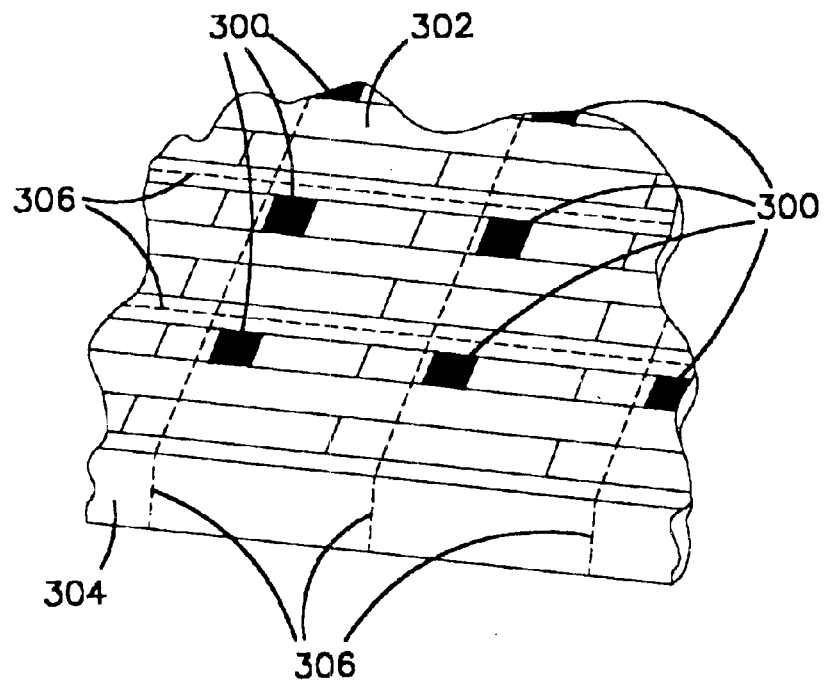
FIG. 8 is a fragmentary perspective view of a section of wafer with the top surface of wafer contoured for the air bearing surface of glide heads using a thermal transducer mounted directly on the air bearing surface.

As described above, a thermal transducer can be located directly on the air bearing surface. To form the glide heads with the thermal transducers located on the air bearing surface, a plurality of thermal transducers 300 can be applied along the smooth surface 302 of wafer 304, as shown in FIG. 8. Thermal transducers 300 can be applied to smooth surface 302 using thin film deposition techniques such as photolithography and vapor deposition. Thermal transducers 300 can be made from materials that change electrical resistance in response to temperature changes. Preferred materials for forming thermal transducers include, for example, nickel. After deposition of the thermal transducers, a protective layer such as diamond-like carbon (DLC) can be applied over the surface of the wafer to form a protective layer for the eventual air bearing surface of the resulting glide heads.

After completing the desired processing of the wafer surfaces, the wafer is "diced" or sliced 258 along cutting alleys 306, as indicated in FIG. 8, to produce cut faces. A first cut produces a set of rows with each row suitable for processing into a plurality of glide heads. A second cut along each row produces the individual glide heads with four cut faces. A small quantity of material is lost along cutting alleys 306 during the slicing process.

Following the slicing and "dicing" process, any additional processing of the glide heads is completed 260. For example, if desired, the cut faces of the glide head can be smoothed using one or more stages of lapping. Lapping can involve mechanical polishing with abrasives or other smoothing processes. Electrical contacts or the like can be added along the edges of the glide head, if needed. For example, electrical contact pads such as 190 and 192 of FIG. 6 can be added along the rear edge of the glide head to provide contact with a thermal transducer on the air bearing surface. Additional processing can be performed to prepare the glide head for mounting to the final assembly.

Figure 9:
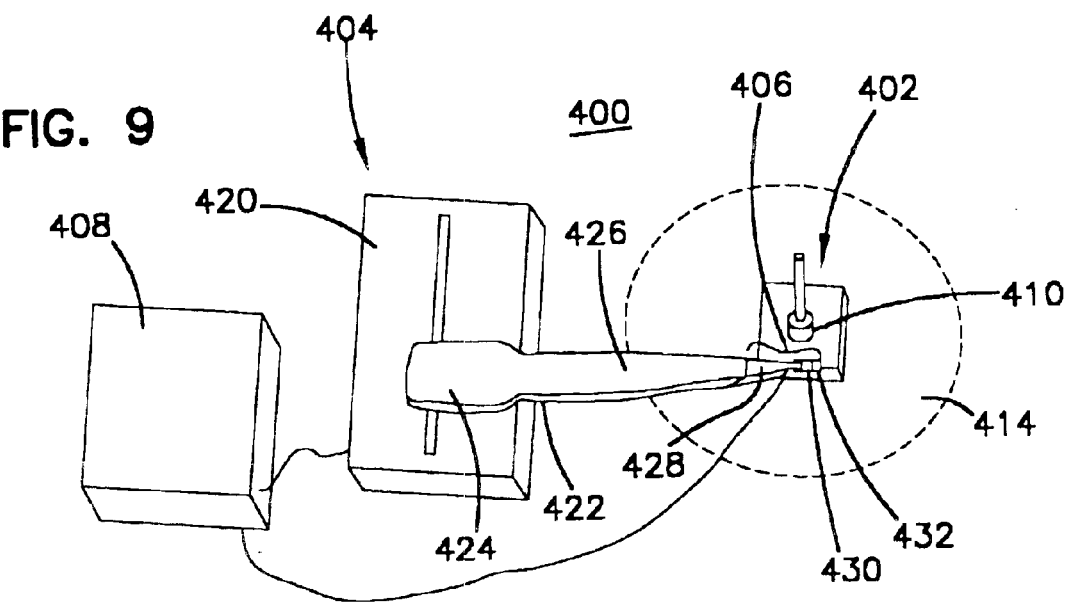
FIG. 9 a schematic perspective view of an asperity detection system.

Following preparation of the glide head, it is attached to a suspension 262. The head/suspension assembly also known as HGA then can be mounted on the test stand. An embodiment of an asperity/defect detection apparatus 400 is shown in FIG. 9. Glide tester 400 includes a glide spinstand 402, an arm assembly drive 404, a suspension/glide head assembly 406 and a controller 408. Glide spinstand 402 includes a spindle motor 410 and disc 414, shown in phantom lines. Spindle motor 410 supports and spins disc 414. Arm assembly drive 404 has a motorized drive 420 and an arm 422. Arm 422 has a support portion 424 that connects with motorized drive 420 and an extension portion 426 that extends over disc 414. Motorized drive 420 moves arm 422 either by lateral motion or by rotational motion to alter the radial position of glide 406 along a disc 414 mounted on glide spinstand 402.

Suspension/glide head assembly 406 generally includes suspension 428, gimbal 430 and glide head 432. Suspension 428 is connects with arm 422. Glide head 432 is connected to suspension 428 by way of gimbal 430. Suspension 428 and gimbal 430 can have a variety of designs including conventional structures.

Controller 408 is connected to arm assembly drive 404 and spindle motor 410. Controller 408 correlates the position of arm 422 with the rotational speed of spindle motor 410 to maintain a desired linear speed of glide head 432 relative to the disc surface. Also, controller 408 correlates impact information detected by glide head 432 with a location on disc 414.

The embodiments described above are intended to be illustrative and not limiting. Additional embodiments are within the claims below. Although the present invention has been described with reference to preferred embodiments, workers skilled in the art will recognize that changes may be made in form and detail without departing from the spirit and scope of the invention.

What is claimed is:

1. A wafer comprising a glide head array including a plurality of rows and a plurality of columns of glide portions having air bearing surfaces formed on a surface of the wafer and an array of glide transducers on the wafer to form a plurality of glide heads.

2. The wafer of claim 1 wherein the air bearing surfaces comprise rails.

3. The wafer of claim 1 wherein said surface of the wafer has a flatness less than about 3 $\mu$m.

4. The wafer of claim 1 wherein the wafer comprises aluminum oxide/titanium carbide.

5. The wafer of claim 1 wherein the surface of the wafer has a peak-to-valley flatness less than about 1 μinch.

6. The wafer of claim 1 wherein the surface of the wafer has a surface flatness less than about 1 μinch.

7. The wafer of claim 1 wherein the surface of the wafer has a flatness less than about 0.5 μinch.

8. The wafer of claim 1 where the array of glide transducers includes an array of piezoelectric transducers.

9. The wafer of claim 1 wherein the array of glide transducers are formed on the surface of the wafer having the air bearing surfaces formed thereon.

10. The wafer of claim 1 wherein the air bearing surfaces of the plurality of rows and the plurality of columns of glide portions are formed using one of or a combination of saw cutting.

11. The wafer of claim 1 wherein the glide head array includes an array of wing portions and the array of glide transducers are formed thereon.

12. A wafer comprising a glide head array including a plurality of rows and a plurality of columns of glide portions having air bearing surfaces formed on a surface of the wafer and an array of glide transducers on the wafer to form a plurality of glide heads wherein the array of glide transducers are mounted on a wafer surface opposite to the surface of the wafer having the air bearing surfaces formed thereon.

13. The wafer of claim 12 wherein the glide head array includes an array of wing portions and the array of glide transducers are formed thereon.

14. A glide head formed from a wafer comprising a plurality of rows and a plurality of columns of glide portions having a plurality of air bearing surfaces formed on a surface of the wafer and an array of glide transducers on the wafer and the glide head formed from one of said glide portions.

15. A detection system for detecting asperities comprising the glide head of claim 14 supported on an armature operable to position the glide head over a disc surface for glide testing and including a transducer on the glide head to detect interactions between the glide head and the disc surface.

16. A wafer comprising a glide head array including a plurality of rows and a plurality of columns of glide portions having air bearing surfaces formed on a surface of the wafer and an array of glide transducers on the wafer to form a plurality of glide heads wherein the array of glide transducers includes an array of thermal transducers formed on the surface of the wafer having the air bearing surfaces formed thereon.

17. The wafer of claim 16 wherein the thermal transducers of the array of thermal transducers are formed of magnetoresistive sensors.

* * * * *